United States Patent [19]

Seroussi et al.

[11] Patent Number: 5,377,340
[45] Date of Patent: Dec. 27, 1994

[54] METHOD AND APPARATUS FOR MEMORY INTERLEAVING USING AN IMPROVED HASHING SCHEME

[75] Inventors: Gadiel Seroussi, Cupertino, Calif.; Abraham Lempel, Haifa, Israel

[73] Assignee: Hewlett-Packard Company, Palo Alto, Calif.

[21] Appl. No.: 717,231

[22] Filed: Jun. 18, 1991

[51] Int. Cl.⁵ .............................................. G06F 12/00
[52] U.S. Cl. ............................... 395/400; 364/DIG 1; 364/DIG. 2
[58] Field of Search .............................. 395/400, 425; 364/DIG. 1, DIG. 2, 246.3, 246.4, 966.3, 966.4

[56] References Cited

U.S. PATENT DOCUMENTS

| | | | |
|---|---|---|---|
| 5,111,389 | 5/1992 | McAuliffe et al. | 395/800 |
| 5,133,061 | 7/1992 | Melton et al. | 395/425 |
| 5,134,695 | 7/1992 | Ikeda | 395/400 |
| 5,247,645 | 9/1993 | Mirza et al. | 395/400 |

Primary Examiner—Joseph L. Dixon
Assistant Examiner—Jack A. Lane

[57] ABSTRACT

A novel memory hashing system is disclosed. The system converts an address into a hashed address of the form (B,C) where B is a module number in a multi-module memory system and C is an offset in the module. The system can be shown to have no pathological cases for any stride value less than some predetermined value. An apparatus according to the present invention is conveniently implemented in a pipelined architecture which allows one address value to be calculated each memory cycle. The present invention utilizes a special matrix calculated from a primitive polynomial for calculating the hashed addresses. The conversion of any given address requires one row of the matrix. The entries of the matrix may be stored in ROM. Alternatively, the required row of the matrix may be calculated in response to receiving the address which is to be convened to the hashed address.

7 Claims, 8 Drawing Sheets

FIGURE 2

Canonical Matrix

|  | LSB |  |  | MSB |  |
| --- | --- | --- | --- | --- | --- |
| A mod P | 0 | 1 | 2 | 3 | 4 |
| 0: | 1 | 0 | 0 | 0 | 0 |
| 1: | 0 | 1 | 0 | 0 | 0 |
| 2: | 0 | 0 | 1 | 0 | 0 |
| 3: | 0 | 0 | 0 | 1 | 0 |
| 4: | 0 | 0 | 0 | 0 | 1 |
| 5: | 1 | 0 | 1 | 0 | 0 |
| 6: | 0 | 1 | 0 | 1 | 0 |
| 7: | 0 | 0 | 1 | 0 | 1 |
| 8: | 1 | 0 | 1 | 1 | 0 |
| 9: | 0 | 1 | 0 | 1 | 1 |
| 10: | 1 | 0 | 0 | 0 | 1 |
| 11: | 1 | 1 | 1 | 0 | 0 |
| 12: | 0 | 1 | 1 | 1 | 0 |
| 13: | 0 | 0 | 1 | 1 | 1 |
| 14: | 1 | 0 | 1 | 1 | 1 |
| 15: | 1 | 1 | 1 | 1 | 1 |
| 16: | 1 | 1 | 0 | 1 | 1 |
| 17: | 1 | 1 | 0 | 0 | 1 |
| 18: | 1 | 1 | 0 | 0 | 0 |
| 19: | 0 | 1 | 1 | 0 | 0 |
| 20: | 0 | 0 | 1 | 1 | 0 |
| 21: | 0 | 0 | 0 | 1 | 1 |
| 22: | 1 | 0 | 1 | 0 | 1 |
| 23: | 1 | 1 | 1 | 1 | 0 |
| 24: | 0 | 1 | 1 | 1 | 1 |
| 25: | 1 | 0 | 0 | 1 | 1 |
| 26: | 1 | 1 | 1 | 0 | 1 |
| 27: | 1 | 1 | 0 | 1 | 0 |
| 28: | 0 | 1 | 1 | 0 | 1 |
| 29: | 1 | 0 | 0 | 1 | 0 |
| 30: | 0 | 1 | 0 | 0 | 1 |

METHOD AND APPARATUS FOR MEMORY INTERLEAVING USING AN IMPROVED HASHING SCHEME

FIELD OF THE INVENTION

The present invention relates to computer memory systems and, more particularly, to devices for interleaving memory modules to provide faster memory accesses.

BACKGROUND OF THE INVENTION

With the continuous advances in semiconductor technology and architecture design, computer central processing unit (CPU) clock rates have increased dramatically in recent years, in a trend that is expected to continue in the near future. Memory chips, on the other hand, have seen significant but less dramatic increases in speed. In order to take full advantage of a powerful CPU, a computer memory system must be able to sustain data transfer rates matched to the CPU processing capabilities. One solution to this problem is offered by memory interleaving. An interleaved memory includes a number of memory modules. Each memory module is capable of servicing a memory request independent of the other modules. Hence, more than one module can be processing requests at any given time. This parallel processing capability may be used to attain effective memory speeds which are greater than the speed of any single memory module.

To be effective, such a memory module system must operate in an environment in which successive memory requests generated by a program running on the CPU are, on average, processed by different memory modules. If two successive requests must be processed by the same memory module, then the beginning of the processing of the second request will be delayed until the processing of the first request has been completed. If, however, the successive requests are processed by different memory modules, the processing of the second request may begin different the end of the processing of the first request.

In principle, a programmer with a knowledge of the specific computer on which his or her program is to run can allocate the storage for that program such that successive memory requests will be processed by separate memory modules. Unfortunately, such a scheme is impractical for at least two reasons. First, the labor needed to arrange for such an allocation is excessive. Second, the particular storage allocation would be advantageous for only those computers having exactly the same memory module structure. A different storage allocation would need to be generated for each computer on which the program was to be run.

Consequently, hardware schemes referred to as hashing schemes have been employed to accomplish the storage allocation on such systems. In hashed systems, the programmer treats the main memory as consisting of a single large block of contiguous memory addresses. The actual memory consists of M memory modules, where M is a positive integer (usually, a power of 2). Each main memory address is mapped to a module, and to an address within that module by special purpose hardware associated with the computer memory. In principle, one memory request can arrive on each clock cycle; hence, the hashing hardware must be capable of generating the required mappings at one per CPU cycle.

In addition, it is advantageous to have ms small a latency time as possible in the hardware. In principle, the speed requirement may be met by employing a pipelined hash processor which receives one memory address to be converted each cycle and calculates one converted address each cycle. The calculated address will, in general, correspond to a main memory address received several cycles earlier. The delay in question is referred to as the latency of the processor. The CPU may compensate for this latency by sending addresses in advance of the time at which the result is needed. However the CPU cannot always predict the required sequence of main memory addresses sufficiently in advance. When a mistake is made, a delay is introduced into the processing. The delay in question is typically of a magnitude equal to the latency time of the pipe-line. Hence, pipe-lines with minimum latency time are advantageous.

One prior art system for hashing utilizes a mapping in which the least significant bits of the main memory address determine which memory module is associated with that address. For example, consider a computer memory having 8 memory modules. If the least significant 3 bits of the main memory address are interpreted as the module address, successive memory addresses will be mapped in different memory modules. Those addresses ending in 000 will be mapped to the first memory module, those ending with 001 to the second memory module, and so on. Hence, if the program sequentially addressed each location in a block of main memory address, the successive requests would always be processed by different memory modules.

In practice, the sequence of memory addresses accessed by a computer program is unpredictable at computer design time, and it varies widely among different computer programs. There will always be sequences of memory requests that must be processed by the same memory module. Hence, the best that any hashing scheme can accomplish is to guarantee that the storage is allocated such that the most common sequences of memory requests are not required to be processed by the same memory module. One of the most common sequences of memory address requests is an arithmetic progression of the form a, a+s, a+2s , . . . . Such requests are typically generated by a program which is sequentially accessing the elements of an array of fixed size data objects. The base address, a, is the address of the beginning of the array, and the stride, s, is the size of the data objects.

The simple prior an hashing scheme described above will function adequately in this environment if the number of memory modules is not an integer multiple of a non-trival divisor of the stride s. For example, if the number of memory modules is equal to s, successive requests must be processed by the same memory module, and the hashing scheme fails. Since the stride is different for different programs, there will always be pathological cases in which the stride is equal to the number of memory modules and the hashing scheme will fail. In this regard, it should also be noted that memory speed degradation may also occur if the stride is an integer fraction of the number of memory modules. Consider a memory with 8 modules in which the processing time required by each module is 8 clock cycles and the CPU sends requests each clock cycle. Assume that the stride is equal to 4, and the first request is made of the first memory module. The second request will be made to the 5th memory module and the third request will be made of the first memory module. However, the first memory module will still be processing the previous request. Hence, the third request will be delayed by 6 clock cycles. In addition, the delay will accumulate with each additional request.

Since data objects tend to be allocated in sizes which are powers of 2 and the number of memory modules in a memory are also often powers of 2, degradation often results. Hence, pathological cases are sufficiently common to result in performance degradation in the above described prior art hashing schemes.

For the purposes of this discussion, a hashing scheme will be said to have "no pathologies" if, on the average, the distribution of memory accesses to the different modules is very close to uniform for any stride less than some predetermined maximum. If this condition is satisfied, each memory module will be accessed roughly the same number of times in a long sequence of accesses.

Broadly, it is an object of the present invention to provide an improved hashing scheme.

It is a further object of the present invention to provide a hashing scheme that lacks pathological cases for all stride values less than some predetermined stride value.

It is yet another object of the present invention to provide a hashing scheme which is implementable in a pipe-lined architecture with a small latency time.

These and other objects of the present invention will become apparent to those skilled in the art from the following detailed description of the present invention and the accompanying drawings.

BRIEF DESCRIPTION OF THE DRAWINGS

FIG. 2 is an example of a canonical matrix obtained by applying the method of the present invention.

SUMMARY OF THE INVENTION

The present invention comprises an apparatus for assigning a memory address A to a memory module M comprising one of $2^m$ memory modules in an interleaved memory. It may be shown mathematically that the present invention does not have any pathological cases as described above for any stride value less than a predetermined value. The apparatus includes an input port for receiving an l-bit binary representation of A and circuitry for computing a reduced address value, r, equal to (A mod p), where $p=2^n-1$, $m \leq n \leq l$, and n is a positive integer. In response to the reduced address value being calculated, the present invention generates the $r^{th}$ row of a binary mapping matrix comprising p rows and n columns. The binary representation of M is then generated from m predetermined bits of the generated $r^{th}$ row. The preferred embodiment of the present invention also includes circuitry for computing an offset address within said memory module M. The bits of the binary representation of the offset address are generated from the n-m bits of said $r^{th}$ row of the binary mapping matrix that were not used in generating the binary representation of M and from the bits of the binary representation of the integer part of A/p.

DETAILED DESCRIPTION OF THE INVENTION

Figure 1:
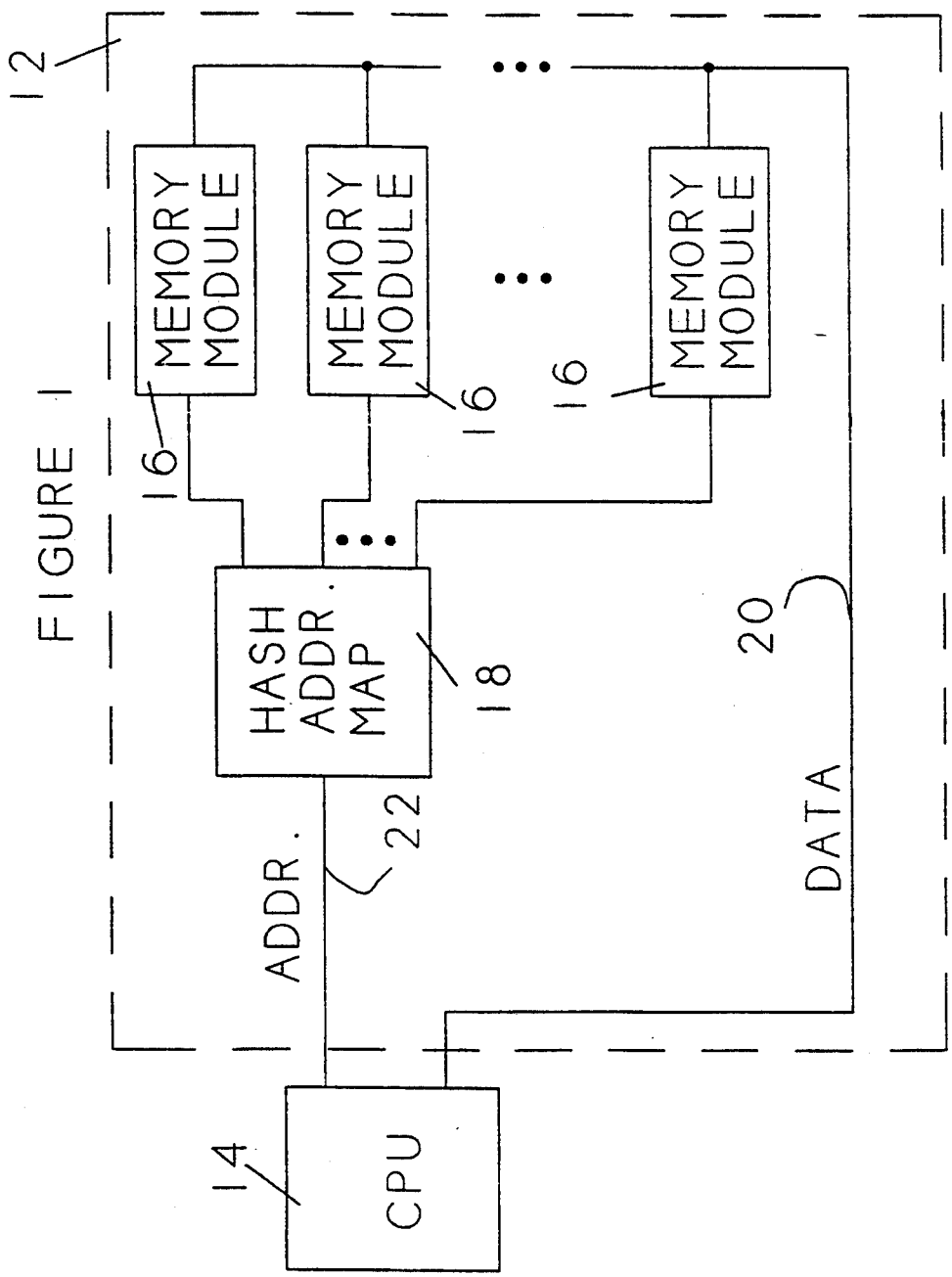
FIG. 1 is a block diagram of a memory which utilizes a hash circuit 18 to process memory request from a CPU.

FIG. 1 is a block diagram of a memory 12 which utilizes a hash circuit 18 to process memory requests from a CPU 14. Memory 12 includes a plurality of memory modules 16. In the following discussion, the number of memory modules will be denoted by M. To simplify the following discussion, it will be assumed that M is a power of two, i.e., $M=2^m$. CPU 14 requests data stored in memory 14 by sending an address, A, to hash circuit 18 on address bus 22. Hash circuit 18 converts address A to a module address B specifying which of the M memory modules is used to store the data specified by A and an offset C within said memory module which specifies the location of the memory cell in said memory module in which the data is stored. Offset C is then transmitted to memory module B which in turn either reads the data from bus 20 and stores said data in memory location C or places the data stored in memory location C onto bus 20. For simplicity, the read/write control lines and various buffers needed to overcome the delays in providing the mapping of A into (B,C) have been omitted from the drawing.

The manner in which hash circuit 18 provides the mapping in question can be divided into two parts. As will be discussed in more detail below, the most important part of the present invention relates to the manner in which the address of the memory module is calculated. The hashing scheme is primarily concerned with the mapping of A to B. Essentially all of the benefits are obtained once a scheme for mapping A to B is provided. Any method of mapping A to C which leads to at most one memory cell in memory module B being assigned to any given address A will provide the same hashing benefits to memory 12. In the preferred embodiment of the present invention, the method of calculating the offset is chosen to minimize hardware costs and latency times.

The mapping from A to B utilized in the present invention depends on the following parameters. Let l denote the length of a full memory address. The possible memory addresses, A, will then run from 0 to $2^l-1$. It will be assumed that the number of interleaved memory modules is a power of 2. Let $M=2^m$ denote the number of interleaved memory modules. Let S denote the maximum expected stride value (i.e. the maximum chosen stride value for which the performance of the hashing scheme is guaranteed not to produce pathological cases). Let n be a positive integer such that:

$m \leq n \leq t$, $S \leq 2^n - 1$, and $p = 2^n - 1$. Here, p is preferably a prime number. For practical values of l, n can be taken from the list {3, 5, 7, 13, 17, 19, 31}.

If p is a prime number it can be proven that the hashing scheme of the present invention has no pathologies. However, the method will provide advantages over the prior art methods even in cases in which p is not prime.

In addition, the mapping from A to B depends on a primitive polynomial, f(x), of degree n. Primitive polynomials are well known to those in the mathematical arts. A list of such polynomials for the above identified list of n values may be found in Wayne Stahnke, "Primitive Binary Polynomials", Mathematics of Computation, 27, No. 124, October 1973. The primitive polynomial is used to generate a matrix having n columns and p rows. This matrix will be referred to as the canonical matrix in the following discussion. The manner in which the canonical matrix is generated will be discussed in detail below. Any n by p matrix obtained by multiplying the canonical matrix to the right by an n by n non-singular binary matrix to obtain another n by p matrix will be referred to as a mapping matrix. Since the identity matrix is a non-singular binary matrix, the canonical matrix is also a mapping matrix. Furthermore, any rearrangement of the columns in the canonical matrix may be accomplished by such a matrix multiplication.

The m bits of the binary representation of B are obtained from the row of the mapping matrix corresponding to the address A in question. The rows of the mapping matrix are numbered from 0 to p−1. The row numbered of the mapping matrix corresponding to an address A is (A modulo p) in the following discussion.

In general, any m columns of the mapping matrix may be used for this purpose, provided the same m columns are used for all addresses. Since any rearrangement of the columns of a matrix is equivalent to the multiplication of said matrix by a non-singular binary matrix, it will be assumed that the first m columns of the mapping matrix are used to define the m bits of the binary representation of B in the following discussion.

The manner in which the canonical matrix is generated will now be explained. To clarify the following discussion, the rules for calculating the canonical matrix will be applied to an exemplary case in which l=20, M=8, and S=30. This corresponds to a memory having addresses between 0 and 1,048,575. In this example, n=5, p=31, and m=3. The primitive polynomial used in this example is $$f(x) = x^5 + x^2 + 1 \tag{1}$$

The canonical matrix obtained by applying the following procedure to the example in question is shown in FIG. 2.

In calculating the canonical matrix all arithmetic is carried out modulo 2. The entries in the $j^{th}$ row of the canonical matrix are the coefficients of $x^j$ in an expansion of $x^j$ in which the primitive polynomial is used to relate powers of x greater than n to a polynomial of degree less than n. The relationship in question is obtained by setting the primitive polynomial equal to 0. In general, the primitive polynomial may be written in the form $$f(x) = \sum_{k=0}^{n} a_k x^k \tag{2}$$

Since the polynomial is of degree n, $a_n$ will always be non-zero. Since all arithmetic is being performed modulo 2, each $a_k$ will either be 0 or 1. Solve f(x)=0 to obtain an expression for $x^n$, i.e., $$x^n = -\sum_{k=0}^{n-1} a_k x^k \tag{3}$$

Since all arithmetic is being performed modulo 2, $a_k = a_k$. Hence, Eq. (3) may be rewritten in the form $$x^n = \sum_{k=0}^{n-1} a_k x^k \tag{4}$$

The entries in the canonical matrix are generated in order by row using Eq. (4) and the previously calculated entries. The entries for rows 0 through n−1 are the coefficients of the polynomial representing $x^k$ for k=0 to n−1. Since $x^k$ can be represented by single term with exponent less than n−1, the entries consist of a one in the column whose number is equal to the row number. Here the columns are numbered from 0 to n−1. The entries for the $n^{th}$ row are the coefficients $a^k$. Referring to FIG. 2, the entries for row 5 are 10100 which correspond to the coefficients of the $x^k$ in Eq. (1) for k=0 to 4. The entries for row n+1 are calculate as follows:

$$x^{n+1} = xx^n = x \sum_{k=0}^{n-1} {}^n c_k x^k = \sum_{k=0}^{n-1} {}^n c_k x^{k+1} \tag{5}$$

$$= {}^n c_{n-1} x^n + \sum_{k=1}^{n-1} {}^n c_{k-1} x^k$$

Here, $n_{ck}$ is the $k^{th}$ entry in row n of the canonical matrix. Using Eq. (4) to replace $x^n$, one obtains, $$x^{n+1} = {}^n c_{n-1} \left( \sum_{k=0}^{n-1} a_k x^k \right) + \sum_{k=1}^{n-1} {}^n c_{k-1} x^k = \tag{6}$$

$$^n c_{n-1} a_0 + \sum_{k=1}^{n-1} [{}^n c_{n-1} a_k + {}^n c_{k-1}] x^k$$

Hence, the $k^{th}$ entry in the (n+1)$^{st}$ row of the canonical matrix is given by $$^{n+1}c_k = {}^n c_{k-1} + a_k {}^n c_{n-1} \tag{7}$$

for k=1 to n−1 and $^{n+1}c_0 = {}^n c_{n-1} a_0$. It must be remembered that the arithmetic is being performed modulo 2.

Referring to the above example, $a_0 = 1$, $a_1 = 0$, $a_2 = 1$, $a_3 = 0$, $a_4 = 0$, $^5c_0 = 1$, $^5c_0 = 1$, $^5c_1 = 0$, $^5c_2 = 1$, $^5c_3 = 0$, and $^5c_4 = 0$. Hence, $^6c_0 = {}^5c_4 a_0 = 0$, $^6c_1 = {}^5c_4 + a_1 {}^5c_0 = 0 + 1*1 =$, and so on.

As noted above, mapping of an address A to memory module B is carried out by calculating a row number r = (A modulo p) in a mapping matrix. The bits in the first m columns of the row r are the binary representation of the module number B corresponding to address A. For example, consider the address 1248 in the above example with the canonical matrix shown in FIG. 2 as the mapping matrix. The corresponding row number is (1248 modulo 31)=8. The first 3 entries on this row are 101. Hence, address 1248 is assigned to memory module 5.

Having described the manner in which the module number is assigned to an address, the manner in which the location within that module is mapped to the address will now be described. As noted above, any method in which at most one location in the memory module is assigned to any given address will operate successfully. The location within the memory module corresponding to an address A will be referred to as the offset in the memory module. In the preferred embodiment of the present invention, the binary representation of the offset consists of l-m bits. The most significant n-m bits of the offset are derived from the remaining n-m bits of the corresponding row of the mapping matrix. These bits are the entries in the (m+1)st through $n^{th}$ columns of the mapping matrix. Hence, in the above example, the most significant bits of the offset for memory address 1248 are 1 and 0.

The least significant bits are calculated from the integer part of the address divided by p. In the above example, the integer part of 1248/p is 40. This number must be converted to a 15 bit binary representation, i.e., 000000000101000. Hence, the entire offset has the binary representation of 10000000000101000=65576. That is, memory address 1248 maps to memory module 5 at offset 65576.

It should be noted that this method of calculating the offset leads to a small number of 37 illegal" memory addresses. These address will not be assigned to a realizable offset in one of the memory modules. The illegal addresses are the addresses with $A > 2^l - 2^{l-n} - 1$. In the above example, there are 32,768 such addresses out of a total possible address range of 1,048,576. In the preferred embodiment of the present invention, the hashed memory is merely treated as being of a slightly smaller size. That is, in the above example, the computer would be programmed as if it were connected to a memory having 1,015,807 addresses instead of 1,048,576 addresses. It should be noted that the illegal addresses may still be accessed by hardware which does not utilize the hashing scheme. For example, the "illegal" addresses can be re-mapped to the beginning of the memory space which is unused in the mapping provided by the hash scheme of the present invention.

Figure 3:
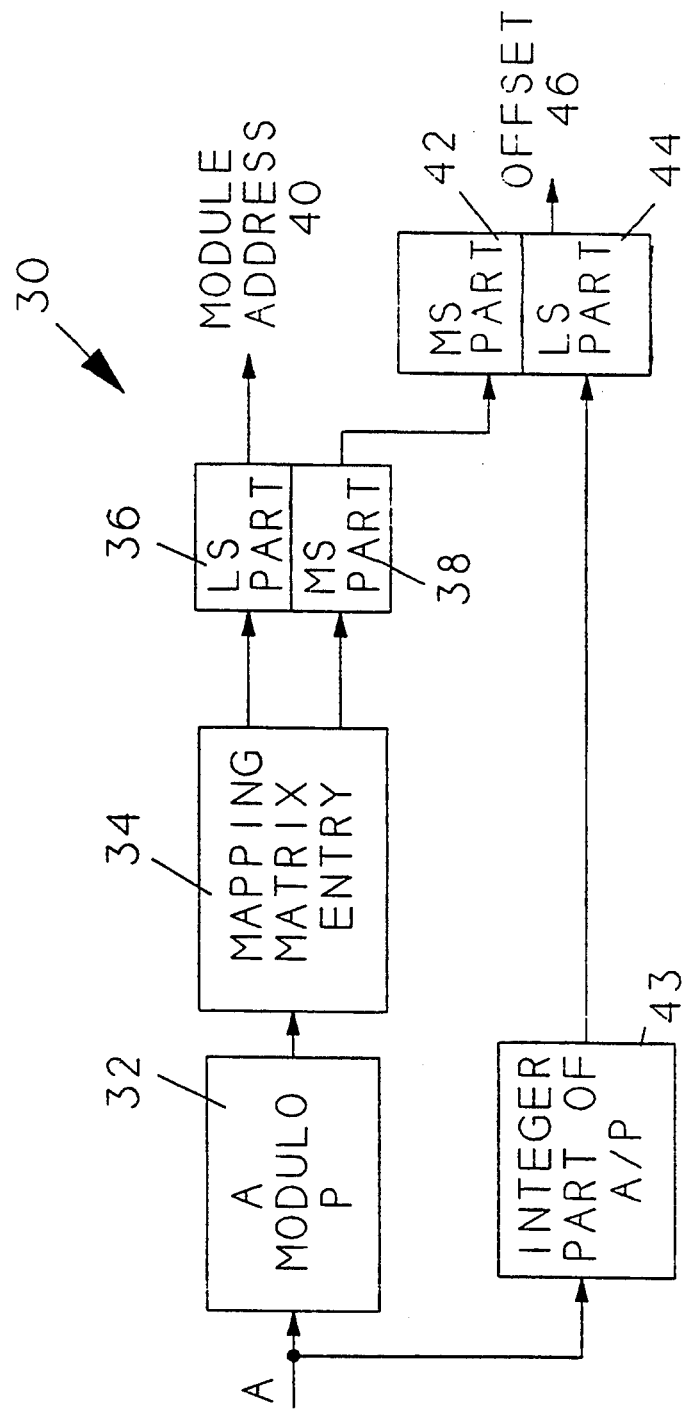
FIG. 3 is a block diagram of a circuit according to the present invention for converting an address A to a module address and offset.

A block diagram of a circuit according to the present invention for converting an address A to a module address and offset is shown in FIG. 3 at 30. Address A is input to a circuit 32 which computes the bits of A modulo p. These bits are input to a mapping matrix circuit which generates an n-bit word whose m least significant bits 36 become module address 40. The remaining bits become the most significant bits 42 of the offset 46. Address A is also input to a divide circuit 43 which computes the integer part of A/p. These bits become the least significant bits 44 of offset 46.

It should be noted that the particular assignment of bits for generating the offset described above is only one of many possible ways of generating the offset o address. For example any rule for generating the offset which is equivalent to generating the bits of the offset ms described above followed by one or more interchange operations will also generate satisfactory offset addresses provided the interchange operations are the same for all addresses. Here, an interchange operation is defined as follows. Let $O_1, \ldots, O_s, \ldots O_t, \ldots O_q$ be the bits of the offset address generated by a first mapping. Then any mapping which generates the bits an offset address according to a rule that is equivalent to interchanging bits $O_t$, and $O_s$ of the address generated by the first mapping will also be a valid offset address mapping.

For small stride values, the mapping matrix may be stored as a table in the memory address hardware. The mapping entry corresponding to an address A is then produced by a simple table lookup. For larger stride values, the entries of the mapping matrix are preferably calculated by special purpose hardware. In general, the special purpose hardware requires a smaller area of silicon than a lookup table in systems designed for large stride values.

Figure 4:
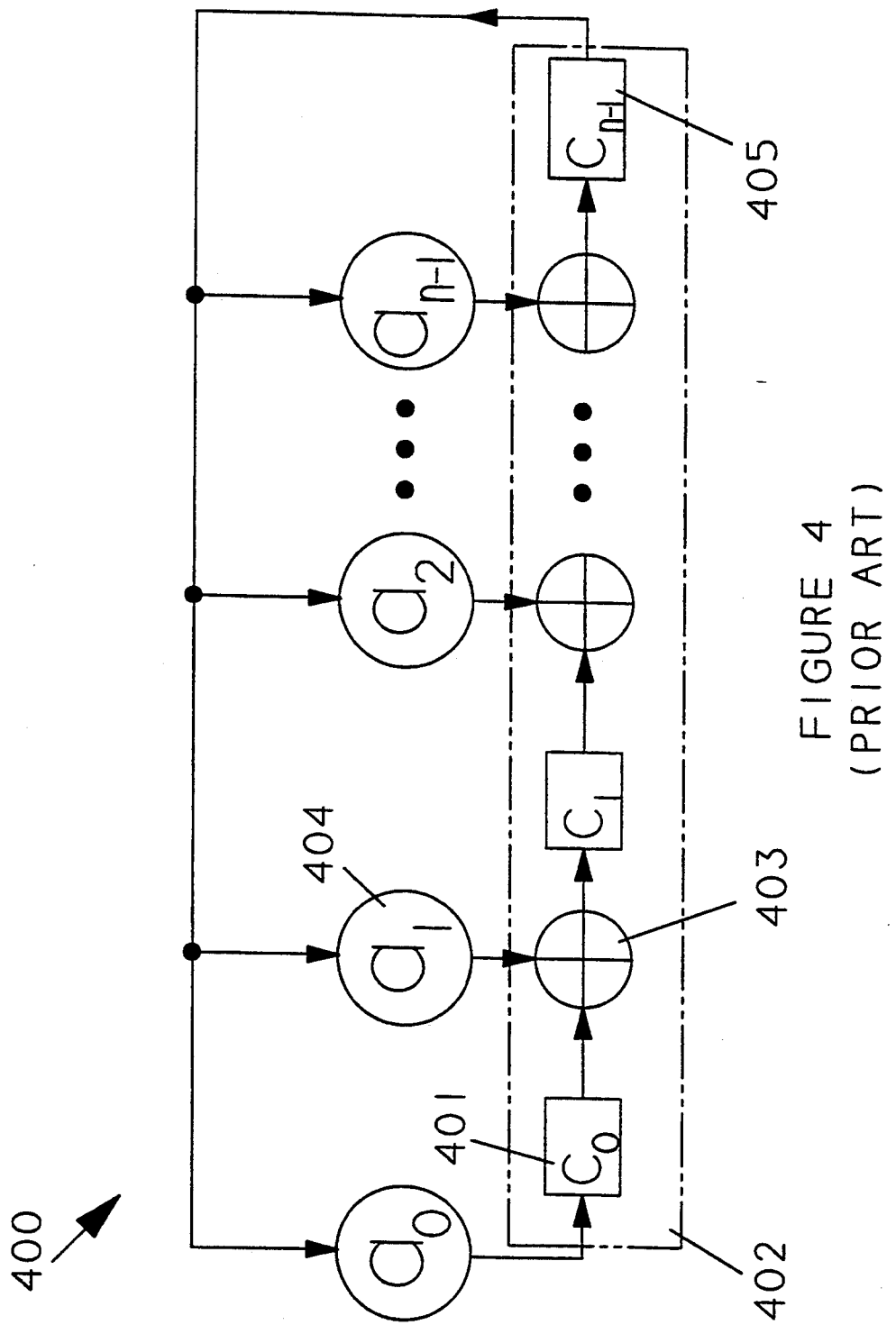
FIG. 4 is a block diagram of a circuit for calculating the rows of a canonical matrix.

Methods for generating the canonical matrix are well known to those skilled in the an of error correcting codes (See F.J. MacWilliams and N.J.A. lo Sloane, *The Theory of Error Correcting Codes*, North-Holland, Amsterdam, 1977). An exemplary circuit for calculating the rows of the canonical matrix one row at a time is shown in FIG. 4 at 400. The circuit 400 consists of an n cell feedback binary shift register 41 )2 in which binary adders 403 are present between each of the cells of the shift register. The input to each binary adder is the sum of the output of the previous cell and a value determined by the output of last cell 405 and the coefficients $a_k$ of the primitive polynomial described above. For each switch 404, the value in question is equal to the output of the last cell 405 if $a_k$ is 1 and 0 otherwise. The addition is performed modulo 2. The cells of shift register 402 are synchronously clocked. If the cells are initially loaded with the value 1,0, ... 0, then after the $j^{th}$ clock cycle, shift register 402 will contain the $(j+1)^{th}$ row of the canonical matrix. Hence, if circuit 400 is clocked (p−1) times, the entire canonical matrix will have been generated. While this circuit is useful as a means of calculating a canonical matrix, it requires too many clock cycles to be useful in a hashing scheme.

Figure 5:
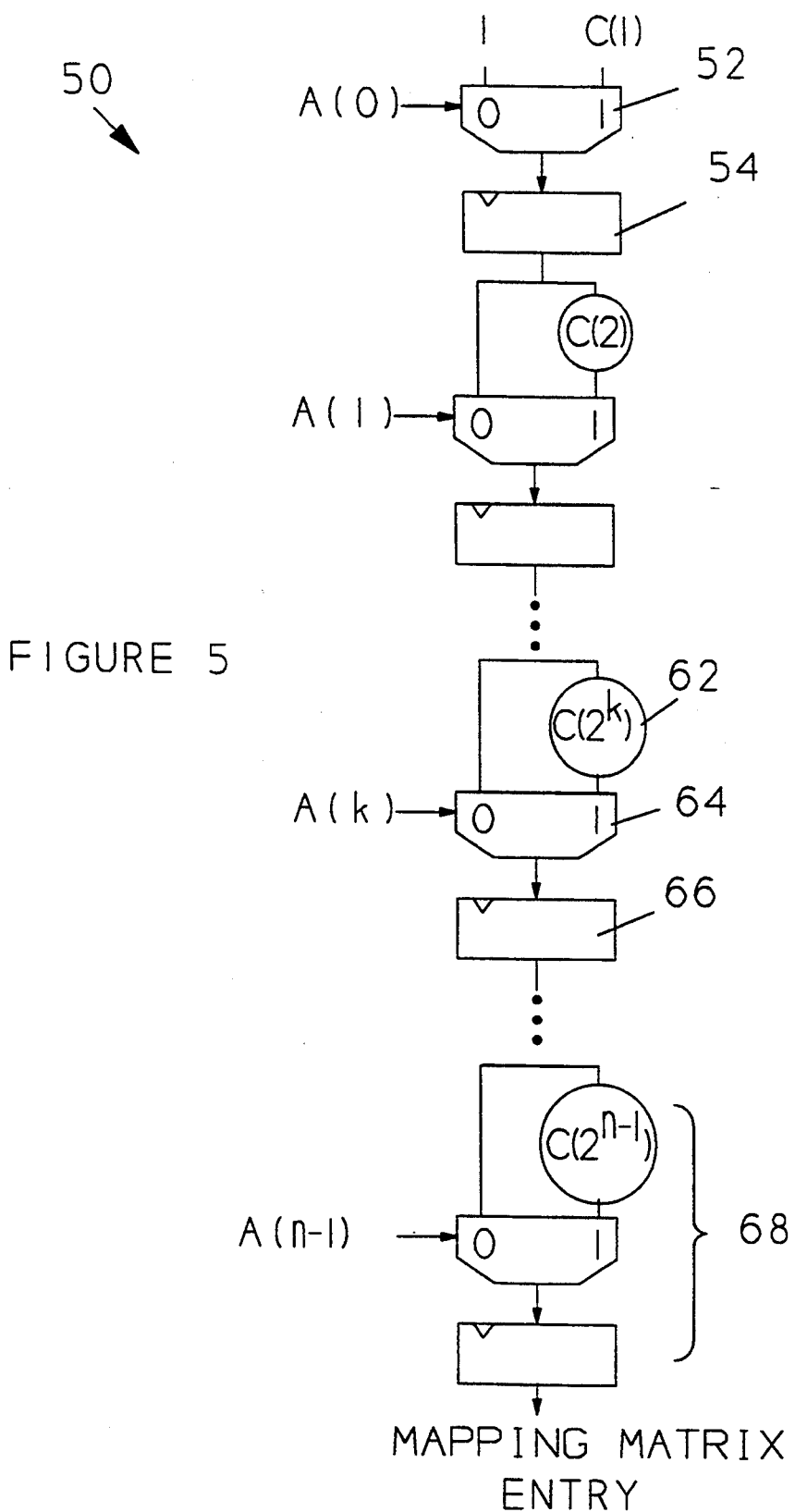
FIG. 5 is a block diagram of a first embodiment of matrix entry calculating circuit according to the present invention.

One embodiment of matrix entry calculating circuit is shown at 50 in FIG. 5. Mapping circuit 50 is constructed from n stages. The mapping entry generated by mapping circuit 50 is determined by the bits of the address modulo p. These bits are denoted by A(0) ... A(n−1). The address modulo p will be referred to as the reduced address in the following discussion. The first stage includes a two-input multiplexer 52 and an n-bit storage register 54. The inputs to multiplexer 52 are n-bit numbers. The two inputs are one and the contents of the second row of the mapping matrix, C( 1 ). The choice of which input is selected is determined by the least significant bit of the reduced address A. If this bit is one, C(1) is selected; otherwise one is ,selected for transmission to register 54.

The remaining stages of mapping circuit 50 each comprise a two-input multiplexer whose output is stored in an n-bit storage register. The input to the multiplexer is either the contents of the storage register in the previous stage or the contents of the storage register in the previous stage multiplied by the contents of a select row of the rows of the mapping matrix. Here, multiplication means multiplication in the finite field $GF(2^n)$. If the mapping matrix is the canonical matrix, this is equivalent to multiplication of binary polynomials modulo f(x) as described above.

The stages may be numbered by the bit of the reduced address used to control the multiplexer in the stage in question. The multiplier 62 used in the $k^{th}$ stage is the contents of row $2^k$ in the mapping matrix. For any given memory design, this multiplication in each stage is multiplication by a constant. Hence, the multiplication circuit 62 may be constructed from a plurality of XOR gates. The required number of gates is less than $n^2$. The output of the last stage 68 is the mapping matrix entry specifying the memory module and the most significant bits of the offset.

The computation performed by mapping circuit 50 is preferably implemented in a pipelined fashion. The computation proceeds from top to bottom, taking n clock cycles to complete. However, each stage is used in only one clock cycle per address calculation. Thus, the pipeline can process n different operations at any given clock cycle. To accomplish this, mapping circuit 50 must be modified to provide storage and registers for the address bits.

Figure 6:
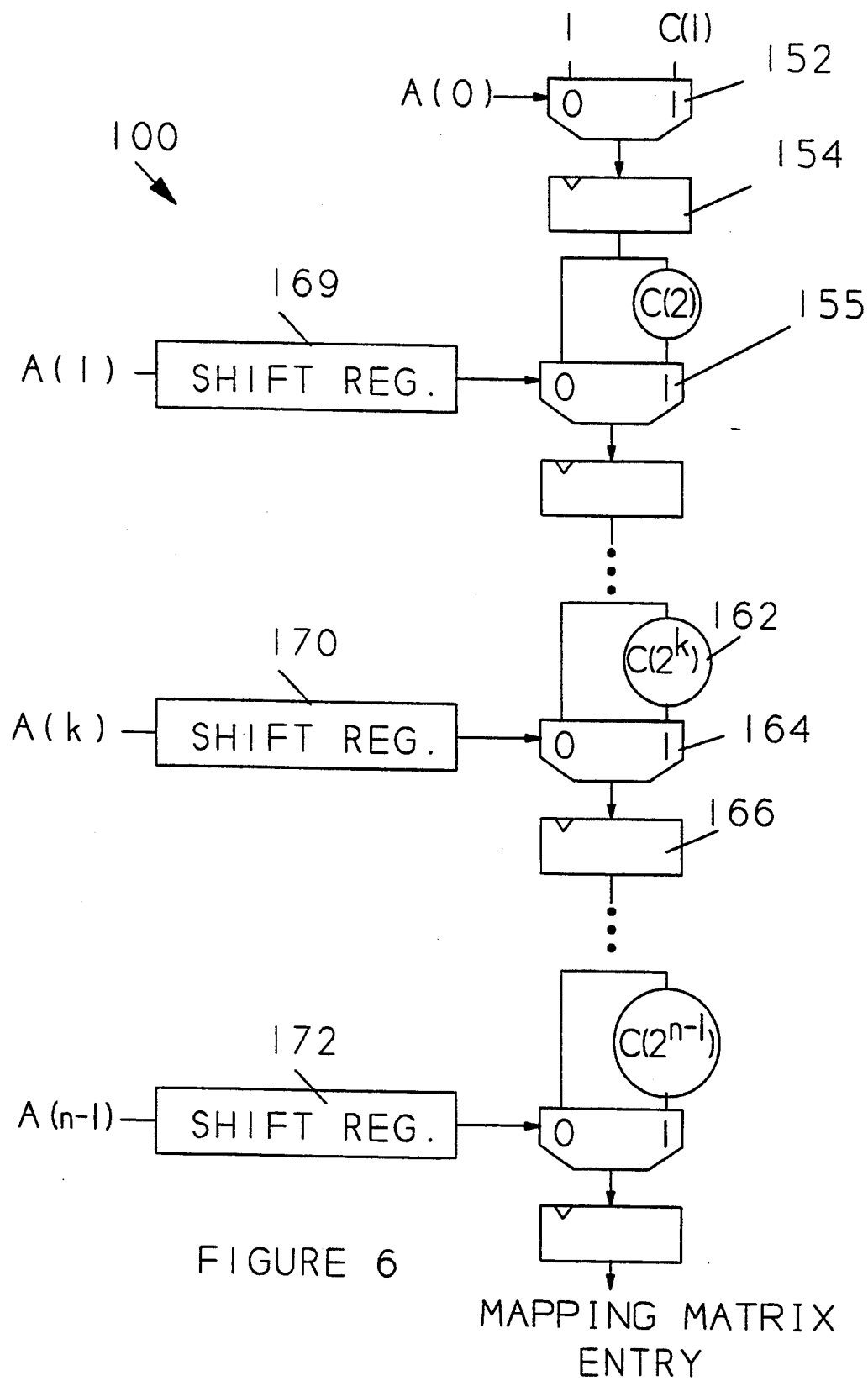
FIG. 6 is a block diagram of a second embodiment of a matrix entry calculating circuit according to the present invention.

A mapping circuit 100 having such registers is shown in FIG. 6. Mapping circuit 100 is similar to mapping circuit 50 in that it is constructed from a plurality of stages. Each stage with the exception of the first stage includes a multiplexer, a multiplication circuit, and a storage register. The $k^{th}$ stage of circuit 100 includes a multiplexer 164 whose inputs are either the output of the storage register in the previous stage or said output multiplied by the contents of row $2^k$ of the mapping matrix. The output of multiplexer 164 is stored in register 166. The first stage includes a multiplexer 152 and a storage register 154, but lacks the multiplication circuit present in the other stages.

The multiplexer in each stage is controlled by an address bit from the reduced address. Each stage operates in response to a clock signal. To simplify the drawings, the clock and connections of each of the components thereto has been omitted from the drawings. However, it is to be understood that each of the circuit elements performs its function in response to receiving a clock signal. During each clock cycle, one reduced address is present to mapping circuit 100. The first bit of this address is used immediately to control multiplier 152. The second bit of this address will be used to control multiplier 155 during the next clock cycle. In general, the $k^{th}$ bit of the reduced address will be used to control the multiplexer in the $k^{th}$ stage k clock cycles after the first bit is used by the multiplier in the first stage. To provide this staggered presentation of the address bits, each stage, other than the first stage, includes a shift register which receives the address bit used to control the multiplexer in that stage. The number of cells in the shift register is equal to the stage number. Hence, shift register 169 includes one cell, shift register 170 includes k cells, and shift register 172 includes (n−1) cells. The output of each of the shift registers are applied to the corresponding multiplexer control lines.

Figure 7:
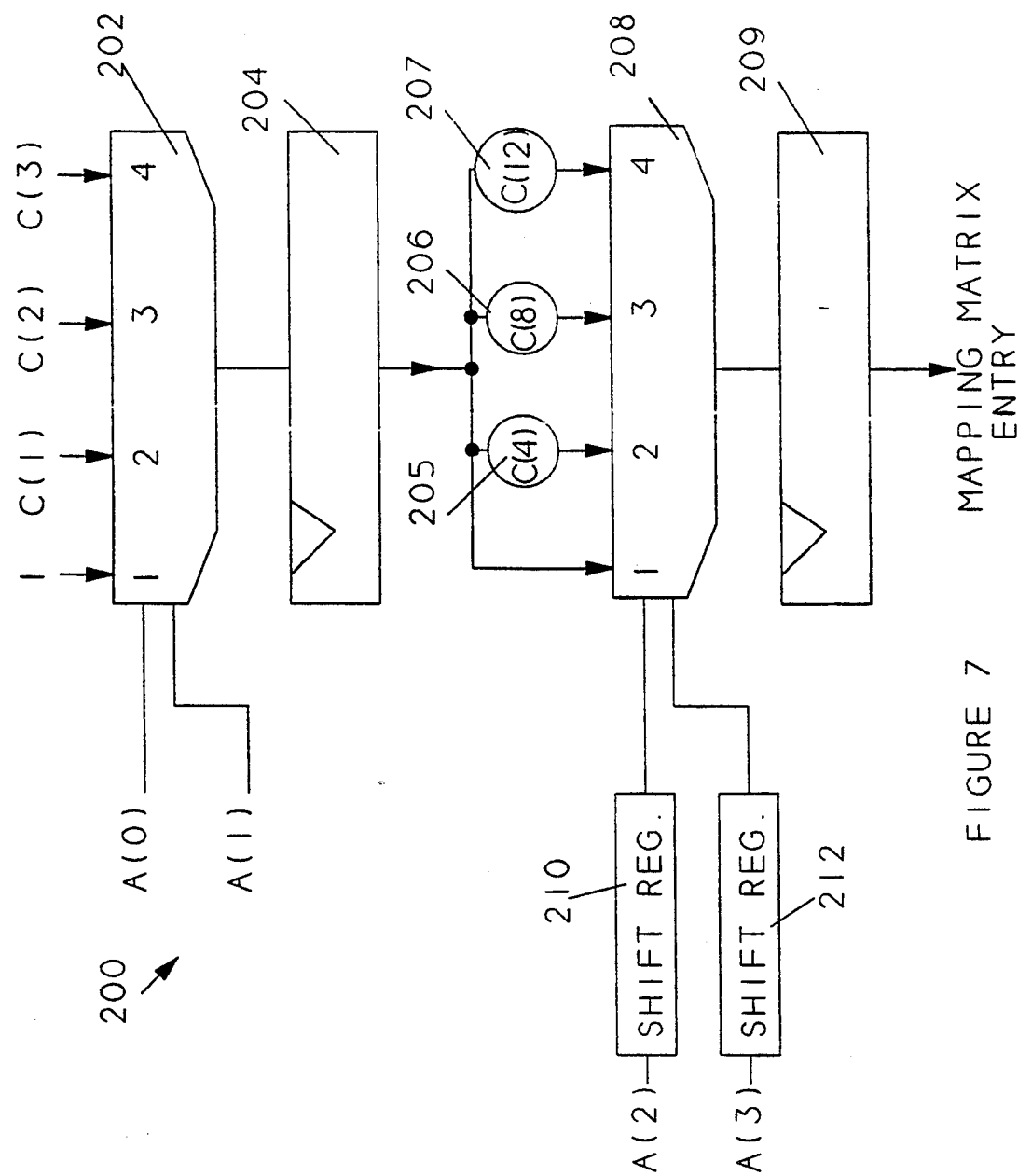
FIG. 7 is a block diagram of a third embodiment of a matrix entry calculating circuit according to the present invention.

Mapping circuit 100 has a latency of n clock cycles. This delay can be reduced by processing Q bits of the address in each stage. An exemplary implementation of a mapping circuit 200 that processes two bits in each stage is shown in FIG. 7. Mapping circuit 200 processes 4 bit reduced addresses, i.e., n=4. Mapping circuit includes a first stage comprising a 4-input multiplexer 202 and a storage register 204. The inputs to multiplexer 202 are 1and the first three entries form the mapping matrix. The specific input chosen is specified by the first two bits of the reduced address. The second stage of mapping circuit 200 consists of multiplexer 208 and register 209. The inputs to multiplexer 208 are the output of the register in the first stage or said output multiplied by the appropriate entry in the mapping matrix as shown at 205–207. The choice of input to multiplexer 208 that is to be stored in register 209 is determined by the second two bits of the reduced address. Since the second stage must operate on the address bits in the clock cycle after the first stage has operated on the first two address bits, one cell shift registers 210 and 212 are used to delay the arrival of the second two bits by one clock cycle.

The hashing method of the present invention also requires the computation of $A' = A \bmod p$ and the integer part $A/p$. Because of the special form of the prime $p = 2^n - 1$, this computation is much simpler than a full-fledged integer division. Consider the case in which $1 \leq 2n$. Let $A[0]$ represent the least significant n bits of A, and let $A[1]$ represent the most significant l-n bits. Then, $$A \bmod p = (A[0] + A[1]) \bmod p, \qquad (8)$$

$$E = A(1) + \left\lfloor \frac{A(0) + A(1)}{p} \right\rfloor \qquad (9)$$

where the above operations utilize normal integer arithmetic. The modular reduction at the right-hand side of Eq. (8) occurs only when the most significant bit of the n+1 bit result is one, or when the n least significant bits are all one. The same condition makes the second summary at the right-hand side of Eq. (9) equal to one. The above formulas can readily be generalized to the case l >2n.

Figure 8:
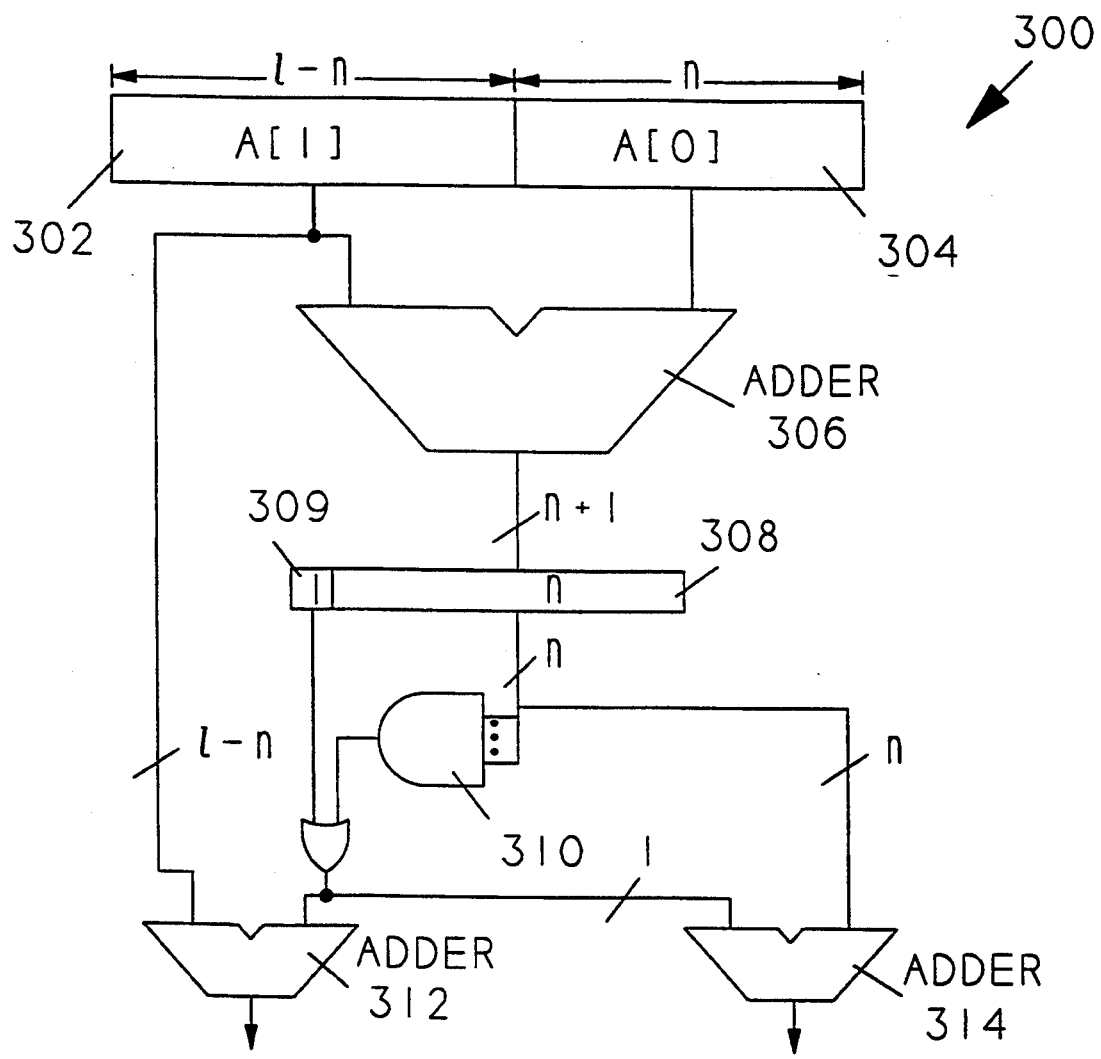
FIG. 8 is a block diagram of a circuit for calculating a reduced address and the least significant bits of the offset according to one embodiment of the present invention.

A circuit for calculating A mod p and E utilizing the above observations is shown in FIG. 8 at 300. The address A is stored in registers 302 and 304, the most significant l-n bits being stored in register 302 and the least significant n bits being stored in register 304. The contents of registers 302 and 304 are added by a full adder 306 to produce an n+1 bit output which is stored in registers 308 and 309, the most significant bit of said output being stored in register 309. As noted above, the binary representation of E is either the most significant l-n bits of the address or this number plus one. Similarly, A mod p is derived from the sum computed by full adder 306. A mod p is equal to the contents of register 308, except when all bits of register 308 are ones or when register 309 contains a one. The first case is sensed by the AND circuit 310 and the later by the contents of register 309. The addition of one to the l-n most significant bits of the address is carried out by adder 3 12. Similarly, the addition of one to the least significant n bits of (A[1] +A[0]), effectively performing reduction modulo p, is carried out by adder 314.

While the present invention has been described in terms of an embodiment in which the m least significant bits of the appropriate mapping matrix entry are used to generate the module address, it will be apparent to those skilled in the art that any m bits from the mapping matrix entry may be used provided the same m columns of the mapping matrix are used for all addresses. As noted above, any matrix obtained by multiplying the canonical matrix by a non-singular n by n matrix from the right is a valid mapping matrix. Any rearrangement of the columns of the mapping matrix can be accomplished by such a matrix multiplication. Hence, a hashing scheme which uses a different choice of m columns to obtain the bits of the module address is equivalent to a hashing scheme using the m least significant bits with a different mapping matrix, the new mapping matrix being related to the original one by such a matrix multiplication.

There has been described herein a novel method and apparatus for assigning memory addresses to the various modules of an interleaved memory. Various modifications to the present invention will become apparent to those skilled in the art from the foregoing description and accompanying drawings. Accordingly, the present invention is to be limited solely by the scope of the following claims.

What is claimed is:

1. An apparatus for assigning a memory address having a value of A. where A is a positive integer, to a memory module B comprising one of $2^m$ memory modules in an interleaved memory, said apparatus comprising:

means for receiving an l-bit binary representation of A;

means for computing a reduced address value, r, equal to (A mod p), where $p=2^n-1$, and n is a positive integer satisfying $m \leq n \leq l$;

means for generating the entries of a binary mapping matrix comprising p rows and n columns, each said row being assigned a unique row number between $0(p-1)$; and means for generating a binary representation of B, said binary representation comprising m predetermined bits of one of said rows of said binary mapping matrix having the assigned row number equal to r, said row being referred to as the $r^{th}$ one of said rows of said binary mapping matrix.

2. The apparatus of claim 1 further comprising means for computing an offset address within said memory module B, the bits of the binary representation of said offset address being determined by the n-m bits of said $r^{th}$ row of said binary mapping matrix that were not used in generating said binary representation of B, and the binary representation of the integer part of A/p.

3. The apparatus of claim 2 wherein said means for generating said binary mapping matrix comprises a plurality of stages including a primary stage and one or more secondary stages.

each said primary and secondary stages comprising:
means for receiving clock signals;
an n-bit input means for receiving the binary representation of an n-bit number;
means for scaling a binary representation of the n-bit number to generate a plurality of scaled inputs, each said scaled input comprising said binary representation of the n-bit number multiplied by a constant having a value equal to one or to a number whose binary representation comprises one row of said binary mapping matrix;

multiplexer means for selecting one of said scaled inputs in response to predetermined bits of r; and
register means comprising means for storing a selected one of said scaled inputs and output means for outputting a stored scaled input; and
said means for generating the entries of said binary mapping matrix further comprising means for generating the value one at an input of said primary stage, said one or more secondary stages being connected in series such that the m-bit input means of each stage is connected to the output means of the register means in the previous stage, an output of the last said secondary stage comprising the $r^{th}$ row of said binary mapping matrix.

4. The apparatus of claim 3 wherein said multiplexer means in said secondary stages further comprise means for delaying the arrival of said predetermined bits of r by a number of clock pulses dependent on the position of one of said secondary stages in said means for generating the entries of said binary mapping matrix.

5. The apparatus of claim 3 wherein said means for computing said reduced address value, r, comprises:
first and second registers, said first register comprising means for storing the l-n most significant bits of A, and said second register comprising means for storing the n least significant bits of A;
first adder means for adding the contents of said first and second registers and generating an (n+1)-bit value representing the sum of said first and second registers, said first adder means including a first sum register for storing the most significant bit of said (n+1)-bit value and a second sum register for storing the least significant n-bits of said (n+1)-bit value;
means for generating a signal having a first value if the contents of said first sum register is a one or if the contents of said second sum register are all ones, and a second value otherwise; and
means for assigning the contents of said second sum register plus one as said reduced address value, r, if said for generating a signal means generates said first value and for assigning the contents of said second sum register as said reduced address value, r, if said for generating a signal means generates said second value.

6. The apparatus of claim 5 wherein said means for computing the integer part of A/p comprises means for assigning said integer part the contents of said first register if said for generating a signal means generates said value and the contents of said first register plus one if said for generating a signal means generates said second value.

7. The apparatus of claim 1 wherein said means for generating said binary mapping matrix comprises memory means for storing said mapping matrix.

* * * * *